(12) United States Patent
Tanaka

(10) Patent No.: US 7,055,568 B2
(45) Date of Patent: Jun. 6, 2006

(54) CORD-EMBEDDED RUBBER TAPE FOR MAKING TIRE COMPONENT, TIRE COMPONENT AND TIRE

(75) Inventor: Yoshikazu Tanaka, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 10/020,167

(22) Filed: Dec. 18, 2001

(65) Prior Publication Data

US 2002/0084016 A1 Jul. 4, 2002

(30) Foreign Application Priority Data

Dec. 20, 2000 (JP) ............................. 2000-387780

(51) Int. Cl.
  B32B 1/04 (2006.01)
  B32B 25/02 (2006.01)
  B60C 9/00 (2006.01)
  B60C 11/00 (2006.01)
  B60C 13/00 (2006.01)

(52) U.S. Cl. ................. 152/451; 152/209.4; 152/209.5; 152/458; 152/531; 156/117; 428/114; 428/156; 428/172; 428/295.4

(58) Field of Classification Search ............ 152/209.1, 152/209.4, 209.5, 458, 531, 451; 428/114, 428/295.4, 156, 167, 172, 173, 220, 295.1; 156/117; 24/30.5 P, 30.5 T; 174/117 F
See application file for complete search history.

(56) References Cited

U.S. PATENT DOCUMENTS

| | | | | | |
|---|---|---|---|---|---|
| 1,321,223 | A | * | 11/1919 | Marquette | 156/179 |
| 1,977,108 | A | * | 10/1934 | Arnberg | 156/179 |
| 2,577,843 | A | * | 12/1951 | Crosby et al. | 156/178 |
| 2,767,113 | A | * | 10/1956 | Bower | 428/156 |
| 2,952,728 | A | * | 9/1960 | Yokose | 174/117 F |
| RE25,349 | E | * | 3/1963 | Hanson | 156/117 |
| 3,177,918 | A | * | 4/1965 | Holman | |
| 3,290,854 | A | * | 12/1966 | McMurray | 24/30.5 T |
| 3,409,948 | A | * | 11/1968 | Goodwin | 24/30.5 T |
| 3,607,497 | A | * | 9/1971 | Chrobak | |
| 3,974,960 | A | * | 8/1976 | Mitchell | 24/30.5 P |
| 4,797,313 | A | * | 1/1989 | Stolk et al. | 428/156 |
| 4,869,307 | A | * | 9/1989 | Bormann et al. | |
| 5,154,964 | A | * | 10/1992 | Iwai et al. | 428/156 |
| 5,400,847 | A | * | 3/1995 | Suzuki et al. | |
| 5,591,279 | A | * | 1/1997 | Midorikawa et al. | |
| 5,935,354 | A | | 8/1999 | Billieres | |
| 6,412,532 | B1 | * | 7/2002 | Iida et al. | |
| 6,425,426 | B1 | * | 7/2002 | Osborne et al. | |

FOREIGN PATENT DOCUMENTS

| | | |
|---|---|---|
| EP | 0 425 318 A2 | 5/1991 |
| EP | 0 425 318 A3 | 5/1991 |
| EP | 0 472 425 A2 | 2/1992 |
| EP | 0 472 425 A3 | 2/1992 |
| EP | 1033218 * | 9/2000 |
| JP | 10-109506 * | 4/1998 |
| JP | 11-020405 | 1/1999 |
| WO | WO 99/22951 A1 | 5/1999 |

\* cited by examiner

*Primary Examiner*—Steven D. Maki
(74) *Attorney, Agent, or Firm*—Birch, Stewart, Kolasch & Birch, LLP

(57) ABSTRACT

A cord-embedded rubber tape, a tire component made by winding such a tape, and a pneumatic tire comprising such a tire component are disclosed, wherein the tape is made of unvulcanized rubber and at least one cord is embedded therein along the length of the tape. The unvulcanized rubber may include short fibers oriented in the longitudinal direction of the tape.

11 Claims, 6 Drawing Sheets

Prior Art

CORD-EMBEDDED RUBBER TAPE FOR MAKING TIRE COMPONENT, TIRE COMPONENT AND TIRE

The present invention relates to a cord-embedded rubber tape wound into a tire component, and a tire component made of windings of such tape, and a pneumatic tire comprising such tire component.

In recent years, for the purposes of reducing the facilities' cost and production cost and making a flexible manufacturing system, it has been proposed to make rubber components (g) such as tread rubber of a pneumatic tire by winding an unvulcanized tape (a) around a drum (d) into a target shape as shown in FIG. 8. An unvulcanized tape is very soft and easily elongates and tears. Thus, an unvulcanized tape is difficult to handle. If the tape elongates during winding, the windings are disordered and the dimensional accuracy is lowered. If the winding speed is increased, such problems frequently arise. Thus, it is very difficult to increase the production efficiency.

An object of the present invention is therefore, to provide a tape for making tire components, in which the above-mentioned drawbacks are removed by embedding a cord in the tape.

Another object of the present invention is to provide a tire component which is made by winding the cord-embedded rubber tape.

Still another object of the present invention is to provide a pneumatic tire which comprises a tire component made of windings of the cord-embedded rubber tape.

According to one aspect of the present invention, a tape which is wound into a tire component is made of unvulcanized rubber in which at least one cord is embedded along the length thereof, the number of the at least one cord is at most three, and a total width of the at least one cord in the widthwise direction of the tape is in a rage of from 1/100 to 1/2 times the width of the tape.

Therefore, the cord or cords prevent an elongation of the tape in the longitudinal direction and provide support for the unvulcanized rubber.

Embodiments of the present invention will now be described in detail in conjunction with the accompanying drawings.

Figure 1:
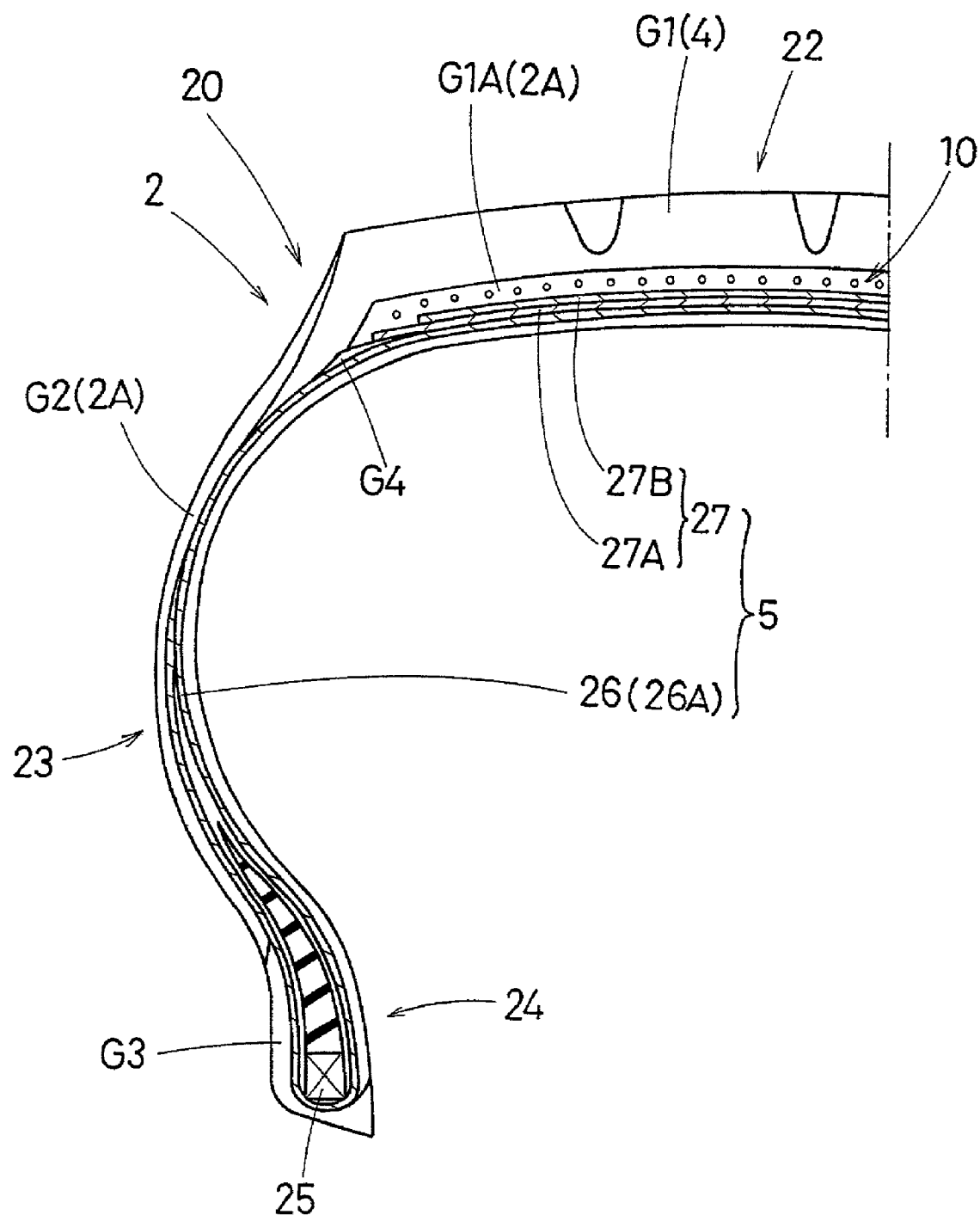
FIG. 1 is a cross sectional view of a pneumatic tire according to the present invention.

In FIG. 1, a pneumatic tire 20 according to the present invention is made up of tire components 2 which include rubber components 4 and cord-reinforced components 5.

The tire 20 comprises a tread portion 22, a pair of sidewall portions 23, a pair of axially spaced bead portions 24 each with a bead core 25 therein, a carcass 26 extending between the bead portions 24, a belt disposed radially outside the carcass in the tread portion. The belt includes a breaker 27 and optionally a band 10, 10' outside the breaker 27.

The carcass 26 comprises a ply of carcass cords arranged radially at an angle in a range of from 70 to 90 degrees with respect to the tire equator, extending between the bead portions 24 through the tread portion 22 and sidewall portions 23 and turned up around the bead core 25 in each bead portion 24.

The breaker 27 comprises two cross plies 27A and 27B of parallel cords arranged at an angle of from 10 to 35 degrees with respect to the tire equator.

As the carcass cords and breaker cords, organic fiber cords, e.g. nylon, polyester, rayon, and aromatic polyamide and the like, and steel cords may be used.

The cord-reinforced components 5 include the carcass 26 and breaker 27 at least.

The rubber components 4 include
a radially outer tread rubber G1 and a radially inner tread base rubber G1A which are disposed in the tread portion 22,
a sidewall rubber G2 disposed in each of the sidewall portions 23,
a chafer rubber G3 disposed in each of the bead portions 24, and
a wedge-shaped breaker cushion rubber G4 disposes between each edge of the breaker 27 and the carcass 26.

In this embodiment, the tread base rubber G1A and an axially inner part of the sidewall rubber G2 (hereinafter the "sidewall base rubber G2A") are each formed by winding a tape 1.

Figure 2A:
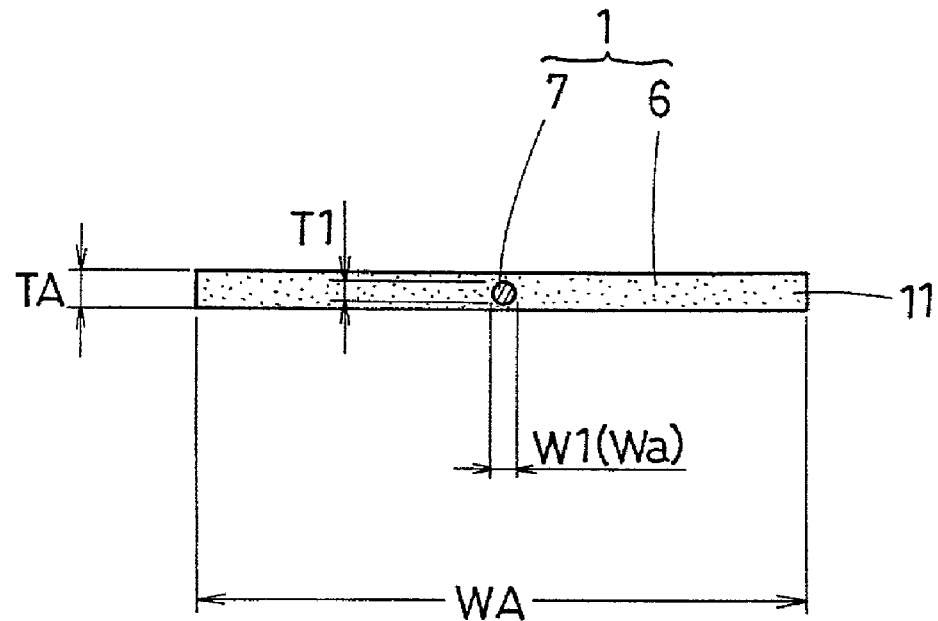
FIG. 2A is a sectional view of a tape according to the present invention.
Figure 2B:
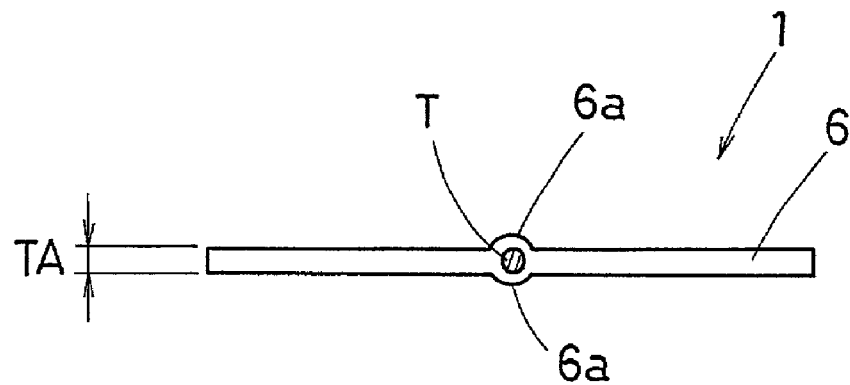
FIG. 2B is a sectional view of another example of the tape.

As shown in FIGS. 2A and 2B, the tape 1 is made of an unvulcanized rubber 6 in which at least one but at most three cords 7 are embedded along the length thereof.

In FIG. 2A showing an example of the tape 1, the thickness TA of the tape 1 is constant across the overall tape width and larger than the cord thickness T1.

In FIG. 2B showing another example of the tape 1, the thickness TA of the tape 1 is large enough in the position of the cord so as to completely cover the cord. But, the remaining most part has a constant thickness not more than the cord thickness T1.

The tape 1 is wound around a drum (d) into a predetermined target cross sectional shape K to make a raw tire component used to make a raw tire.

Figure 3A:
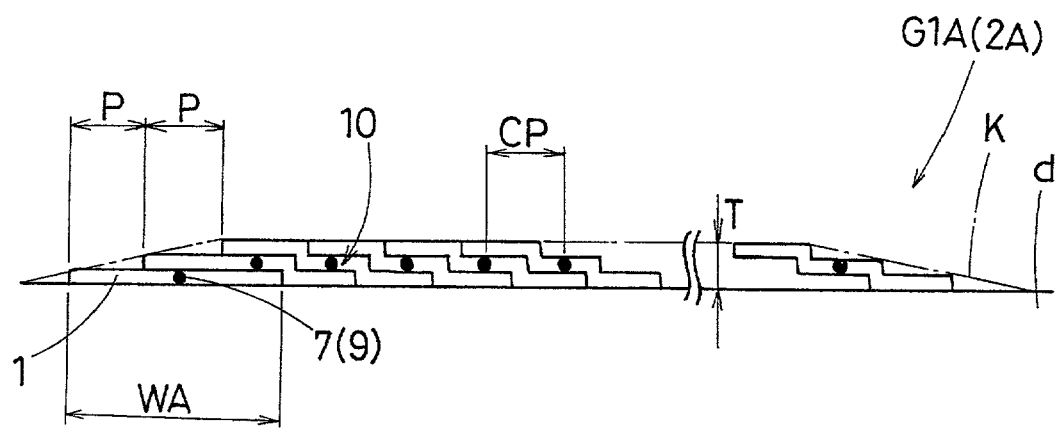
FIGS. 3A, 3B and 3C are schematic cross sectional views of tire components according to the present invention.

For example, in case of the tread base rubber G1A, as shown in FIG. 3A, the target cross sectional shape K is such that the edges portions are tapered but the main portion therebetween is substantially constant thickness.

In order to decrease the difference of the actual cross sectional shape of the windings from the target shape K, it is preferable that the thickness TA of the portion other than the cord position is in a range of from 0.5 to 1.5 mm. The width WA of the tape 1 may be set in a range of from 10 to 30 mm.

The important main function of the cord(s) is to reinforce the tape itself to provide dimensional stability in its longitudinal direction and to feed the very thin unvulcanized rubber tape stably with the drum. However, it is also preferable to provide the cord(s) with an additional function to reinforce the tire component.

When viewed from the main function, various materials, various sizes and various cross sectional shapes such as circle and oval may be employed as far as the rupture strength of the cord(s) 7 is at least 1,000 kgf/sq.cm.

When viewed from the additional function, it is preferable that the cord 7 having a rupture strength of more than about 9,000 kgf/sq.cm and a diameter D of from 0.5 to 1.0 mm is used in order to improve tire performance, tire weight and tire production efficiency.

For the cords 7, organic fiber cords, e.g. nylon, polyester, rayon, aromatic polyamide, cotton yarn and the like may be used.

The total width W1 of the cord(s) 7 is set in a range of from 1/100 to 1/2 times the width WA of the tape 1. The total width W1 is the product of a cord width Wa and the cord number. (Usually, as the cord has a circular cross sectional shape, the cord width Wa is the same as the above-mentioned thickness T1.)

In case of the tread base rubber G1A, an organic fiber cord such as nylon cords is preferably used as the cord 7.

In case of FIG. 3A, the winding pitches P are about 1/3 time the width WA of the tape 1. As a result, the three-layered main portion having a thickness T being about 3 times the thickness TA of the tape 1 is formed.

Figure 3B:
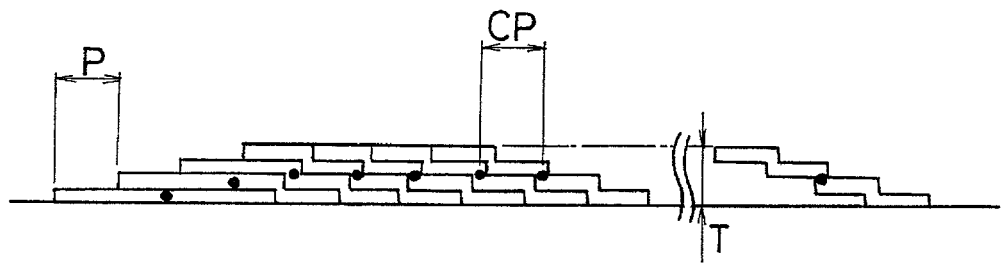
Figure 3C:
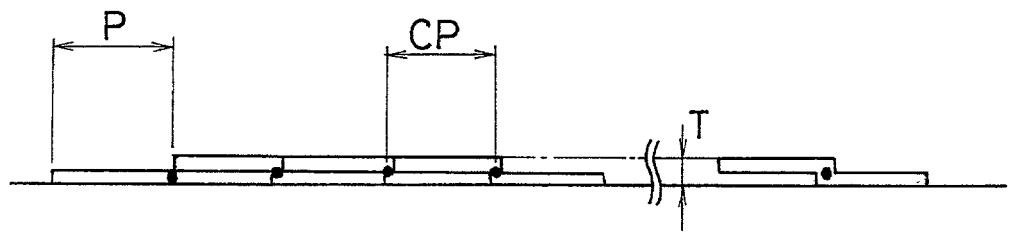

In case of FIG. 3B, as the winding pitches P are about 1/4 time the width WA, the thickness T becomes about 4 times the thickness TA. In case of FIG. 3C, as the winding pitches P are about 1/2 time the width WA, the thickness T is about 2 times the thickness TA.

In any case, a spiral cord structure 10 which functions as a tread band is formed within the tread base rubber G1A at the same time.

As explained above, the cross sectional shape and thickness T of the tire component and the cord pitches CP of the spiral cord structure 10 can be easily controlled by changing the winding pitches P, tape width WA and tape thickness TA.

In case of the tread base rubber G1A, it is also preferable that the unvulcanized rubber 6 of the tape 1 has short fibers 11 which are dispersed therein while being oriented in the longitudinal direction of the tape.

For the short fibers 11, organic fibers, e.g. nylon, polyester, rayon, vinylon, aromatic polyamide, cotton, cellulose resin, crystalline polybutadiene and the like, metal fibers or whiskers, e.g. boron alloy, glass fibers and the like can be used alone or in combination.

Owing to the short fibers 11 oriented in the tire circumferential direction, the steering stability and durability of the tire may be improved. Further, the inclusion of the short fibers 11 may contribute to increasing of the tape feeding speed and winding speed, and improving of the dimensional accuracy, and further simplifying of the tape conveying mechanism.

Figure 4:
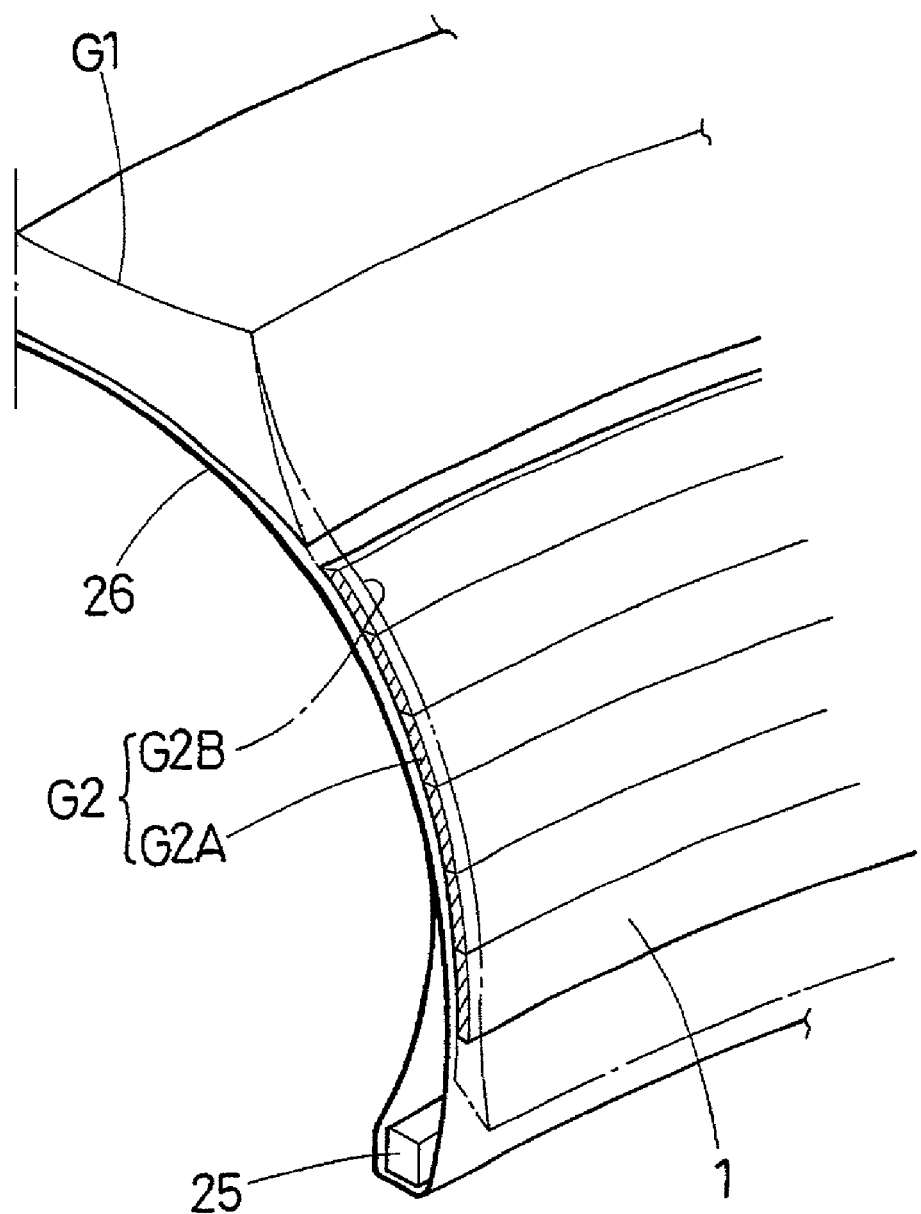
FIG. 4 is a schematic perspective view showing another example of the tire component.

FIG. 4 shows the above-mentioned sidewall base rubber G2A formed by spirally winding a tape 1 on the axially outer surface of the carcass 26 which has been changed from a cylindrical shape to a toroidal shape in a tire making process.

The sidewall base rubber G2A in this example is relatively thin in comparison with the tread base rubber G1A. Thus, a tape 1 whose thickness is almost the same as the sidewall base rubber G2A is wound without overlapping each other and the windings are butt jointed. However, it is also possible to overlap the windings by using a thinner tape.

Further, a veneer sidewall rubber G2B which is a wide strip of sidewall rubber compound is applied to the axially outside of the sidewall base rubber G2A as the axially outermost part of the sidewall rubber G2.

By the cord(s) 7 and short fibers 11 (if used as above), sidewall rigidity is increased to improve the maneuverability, high-speed stability and the like, without deteriorating the ride comfort, which may contribute to a tire weight reduction.

Figure 5:
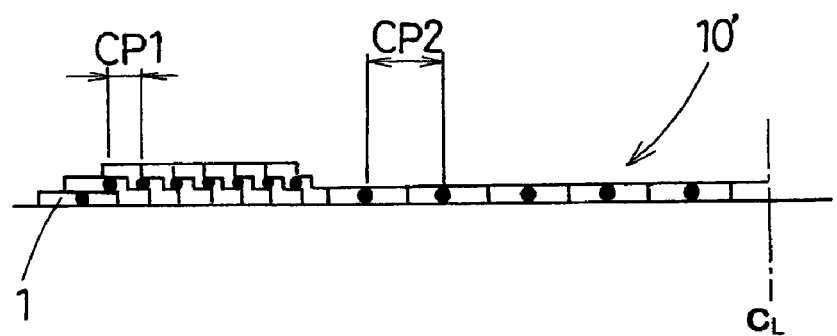
FIG. 5 is a schematic sectional view of still another example of the tire component.
Figure 8:
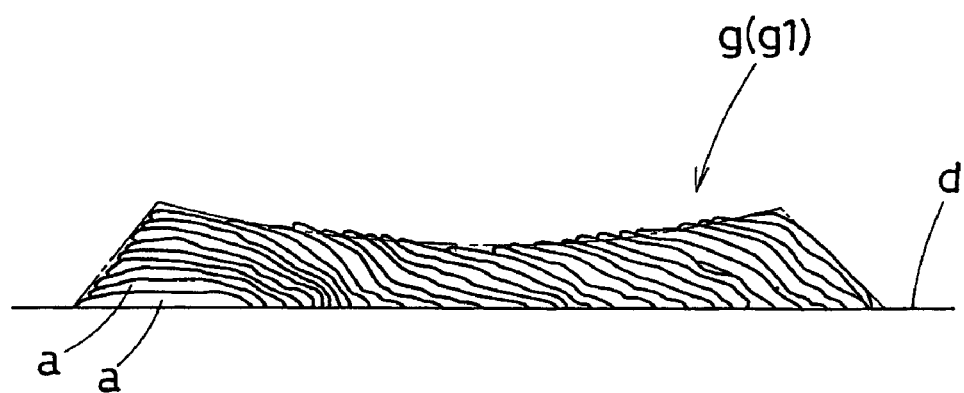
FIG. 8 is a sectional view of a tire rubber component formed by winding a rubber tape according to the prior art.

The above-mentioned rubber tapes 1 can be utilized to make a band 10' disposed on the radially outside of the breaker 27. In FIG. 5, the band 10' is formed by winding a tape 1 at variable cord pitches CP. On the edge portions of the breaker, the cord pitches CP1 are smaller than the tape width WA, but in the central portion, the cord pitches CP2 are the substantially same as or slightly smaller than the tape width WA. In the central portion, the windings are butt jointed or slightly overlapped. If the tape 1 is wound leaving spaces between the windings, air is liable to be trapped therein, and further the hooping force becomes uneven in the axial direction.

Figure 6:
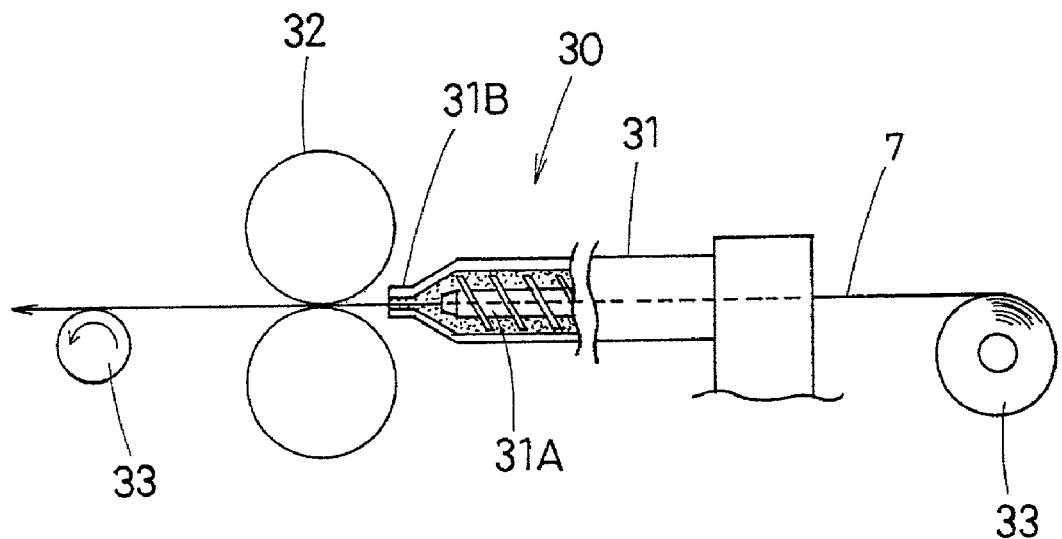
FIG. 6 is a diagram for explaining an apparatus for making the tape.
Figure 7:
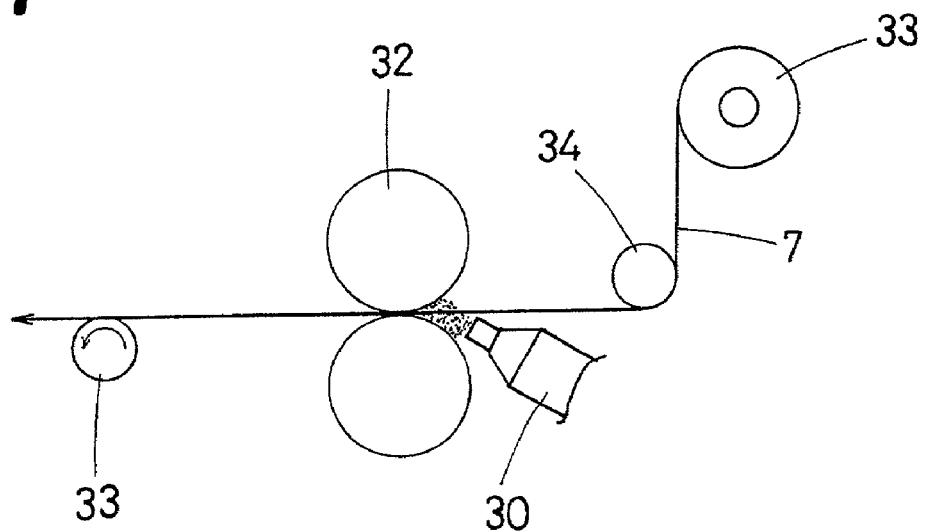
FIG. 7 is a diagram for explaining another example of the apparatus.

FIGS. 6 and 7 each show an apparatus for making the tape 1.

In FIG. 6, the apparatus comprises a screw type rubber extruder 30, a pair of calender rollers 32 disposed near the head of the extruder 30, a cord reel 33 disposed on the back side of the extruder 30, and a pull roller 33 for the tape disposed on the downstream side of the calender roller 32.

The cord 7 supplied from the cord reel 33 is drawn out through the main part 31 of the extruder 30, a through hole extending along a screw axis 31A, the head and a die 31B and a gap between the calender roller 32. At the same time, the unvulcanized rubber 6 is extruded and rolled into the tape having the predetermined thickness TA and width WA.

In FIG. 7, the apparatus comprises a rubber extruder 30, a pair of calender rollers 32 disposed near the head of the extruder 30, a cord reel 33, a guide roller 34 for the cord 7, and a pull roller 33 for the tape on the downstream side of the calender roller 32. In this example, the cord 7 is drawn out through the calender rollers 32 without passing through the inside of the extruder 30, and at the same time, the unvulcanized rubber 6 is extruded and rolled into the tape. In this case, it will be easier than the former example to embed a plurality of cords in the extruded unvulcanized rubber.

As described above, the unvulcanized rubber tape according to the present invention has at least one cord embedded therein. Therefore, the dimensional stability and strength of the tape, especially in the longitudinal direction is greatly improved, and the handling properties are improved. As a result, the tape conveying or feeding speed and winding speed can be increased. Further, it becomes possible to promote simplifying of the tape conveying mechanism. In the pneumatic tire according to the present invention, tire components such as the tread base rubber, sidewall base rubber and tread band are made of windings of the tape. Accordingly, the tire components themselves are reinforced by the cord(s) in the tape, which makes it unnecessary to provide additional reinforcing cord layers or makes it possible to lessen such layers. Also, it is possible to improve the tire weight and tire performance. In the present invention, therefore, the facilities cost and production cost can be effectively reduced.

The invention claimed is:

1. A tape to be wound into a tire component which is made of unvulcanized rubber in which a single cord is embedded along the length thereof, the cord having a diameter being in a range of from 0.3 to 1.5 mm, wherein on each side of the cord embedded portion, a reduced thickness portion having a substantially constant thickness is formed, and the thickness of the tape in the cord embedded portion is larger than the thickness of the tape in each said reduced thickness portion so that the cord is completely embedded in the unvulcanized rubber, and each said reduced thickness portion is wider than the cord embedded portion.

2. A tape to be wound into a tire component which is made of unvulcanized rubber in which a single organic fiber cord is embedded along the length thereof, wherein on each side of the cord embedded portion, a reduced thickness portion having a substantially constant thickness is formed, and the thickness of the tape in the cord embedded portion is larger than the thickness of the tape in each said reduced thickness portion so that said organic fiber cord is completely embedded in the unvulcanized rubber, and each said reduced thickness portion is wider than the cord embedded portion.

3. The tape according to claim 2, wherein said organic fiber cord has a diameter in a range of 0.3 to 1.5 mm, the width of the tape is in a range of from 10 to 30 mm, and the thickness of the tape is in range of from 0.5 to 1.5 mm when measured in each said reduced thickness portion.

4. The tape according to claim 2, wherein the unvulcanized rubber has short fibers therein, and the short fibers are oriented in the longitudinal direction of the tape.

5. A tape to be wound into a tire component which is made of unvulcanized rubber in which a single cord having a diameter in a range of 0.3 to 1.5 mm is embedded along the length thereof, wherein on each side of the cord embedded portion, a reduced thickness portion having a substantially constant thickness is formed, and the thickness of the tape in the cord embedded portion is larger than the thickness of the tape in each said reduced thickness portion so that said cord is completely embedded in the unvulcanized rubber, and each said reduced thickness portion is wider than the cord embedded portion, and the total width of the tape is in a range of from 10 to 30 mm.

6. The tape according to claim 5, wherein the unvulcanized rubber has short fibers therein, and the short fibers are oriented in the longitudinal direction of the tape.

7. A tire component made of windings of a tape, wherein said tape is made of unvulcanized rubber in which a single cord is embedded along the length thereof, on each side of the cord embedded portion, a reduced thickness portion having a substantially constant thickness is formed, and the thickness of the tape in the cord embedded portion is larger than the thickness of the tape in each said reduced thickness portion so that the cord is completely embedded in the unvulcanized rubber, and each said reduced thickness portion is wider than the cord embedded portion.

8. The tire component according to claim 7, wherein the unvulcanized rubber has short fibers therein, and the short fibers are oriented in the longitudinal direction of the tape.

9. A pneumatic tire comprising a tire component made of windings of a tape, wherein said tape is made of unvulcanized rubber in which a single cord is embedded along the length thereof, on each side of the cord embedded portion, a reduced thickness portion having a substantially constant thickness is formed, and the thickness of the tape in the cord embedded portion is larger than the thickness of the tape in each said reduced thickness portion so that the cord is completely embedded in the unvulcanized rubber, and each said reduced thickness portion is wider than the cord embedded portion.

10. The pneumatic tire according to claim 9, wherein said tire component is a sidewall rubber.

11. The pneumatic tire according to claim 9, wherein the unvulcanized rubber has short fibers therein, and the short fibers are oriented in the longitudinal direction of the tape.

* * * * *